United States Patent [19]

Yanagi et al.

[11] Patent Number: 5,066,072
[45] Date of Patent: Nov. 19, 1991

[54] HYDRAULIC BRAKE PRESSURE CONTROL VALVE

[75] Inventors: Kunio Yanagi; Mutsuro Yamakoshi; Akihiro Kamiyoshihara, all of Higashimatsuyama, Japan

[73] Assignee: Jidosha Kiki Co., Ltd., Tokyo, Japan

[21] Appl. No.: 563,245

[22] Filed: Aug. 6, 1990

[30] Foreign Application Priority Data

Aug. 23, 1989 [JP] Japan ............................... 1-98219[U]
Aug. 23, 1989 [JP] Japan ............................... 1-98220[U]

[51] Int. Cl.⁵ .............................................. B60T 8/26
[52] U.S. Cl. .................................... 303/9.75; 188/349
[58] Field of Search .................... 303/9.62, 9.64, 9.65, 303/9.66, 9.67, 9.68, 9.75, 9.69, 9.71, 9.73, 9.74; 188/349; 137/505.25; 251/337; 60/591

[56] References Cited

U.S. PATENT DOCUMENTS

| | | | |
|---|---|---|---|
| 4,475,339 | 10/1984 | Inoue | 137/505.25 X |
| 4,574,834 | 3/1986 | Inoue | |
| 4,664,451 | 5/1987 | Sakaguchi et al. | 303/9.75 |
| 4,668,020 | 5/2987 | Barr | 303/9.75 |
| 4,669,268 | 6/1987 | Takeuchi et al. | 303/9.75 X |
| 4,736,989 | 4/1988 | Myers et al. | 303/9.62 |
| 4,774,809 | 10/1988 | Hayashida et al. | 303/9.75 X |
| 4,813,450 | 3/1989 | Ishiwata et al. | 137/505.25 |
| 4,825,903 | 5/1989 | Ochs et al. | 137/505.25 X |
| 4,957,140 | 9/1990 | Ishiwata | 303/9.62 X |

FOREIGN PATENT DOCUMENTS

| | | | |
|---|---|---|---|
| 0191661 | 11/1983 | Japan | 303/9.75 |
| 64561 | 4/1988 | Japan | |
| 44388 | 12/1989 | Japan | |

Primary Examiner—Douglas C. Butler
Attorney, Agent, or Firm—McGlew & Tuttle

[57] ABSTRACT

The hydraulic brake pressure control valve is provided including a valve casing mounted on a master cylinder of a hydraulic brake system. A valve piston is provided with a stepped configuration with an enlarged diameter portion and a reduced diameter portion. The valve piston is mounted slidably and longitudinally along the longitudinal bore of the valve casing. The valve piston is normally urged into a non-operating position and is shiftable longitudinally in an opposite direction from the non-operating position under the effect of a difference in the cross-sectional areas of the enlarged and reduced diameter portions, upon which hydraulic brake fluid pressure acts. The stepped valve piston is defined with a brake fluid passage extending longitudinally therein providing communication between brake fluid passages adjacent the reduced diameter portion and the enlarged diameter portion of the stepped valve piston. A fluid valve member is disposed in the fluid passage and is adapted to hold the fluid passage in an open position when the stepped valve piston is in a non-operating position and to cause the fluid valve to be opened and closed when the stepped valve piston operates in a valving manner. An arrangement is provided such that when the fluid valve is brought to either an opened or a closed position an outer wall surface associated with the valve member abuts an inner wall surface of the stepped valve piston.

2 Claims, 5 Drawing Sheets

HYDRAULIC BRAKE PRESSURE CONTROL VALVE

FIELD OF THE INVENTION AND RELATED ART STATEMENT

The present invention relates generally to an improvement relating to a hydraulic brake pressure control valve for an automotive vehicle, and more particularly to an improvement in the construction of a control valve for controlling the operating pressure of a hydraulic brake for use in an automotive vehicle.

It has conventionally been known to provide a hydraulic brake pressure control valve for use with an automotive vehicle of a construction such that a given hydraulic brake pressure from a master cylinder in the circuit of the hydraulic brake system for the rear wheel brake cylinders is reduced with a preset proportion to that to be fed to the front wheel brake cylinders.

In general, the hydraulic brake pressure control valve of this type has such a construction which comprises a valve casing mounted on the master cylinder housing and a valve piston with a stepped configuration consisting of a large diameter portion and a reduced diameter portion and mounted slidably within the bore of the outer casing, this stepped valve piston being normally urged toward a non-operating position, with the large diameter portion and the reduced diameter portion being subjected respectively to the hydraulic brake fluid pressures to cause, when so required, the valve piston to be shifted from the non-operating position in the opposite direction to the normal sense of urging noted above under the effect of difference in cross-sectional areas of the two portions to receive the hydraulic fluid working thereupon, and which there is also provided a brake fluid passage defined longitudinally in the stepped valve piston and communicating one brake fluid passage on the part of the reduced diameter portion and the other brake fluid passage on the part of the large diameter portion of the stepped valve piston, a fluid valve being disposed in this brake fluid passage and serving to release the fluid valve in an open position when the stepped valve piston is in the non-operating position, and also to cause the fluid valve to be opened and closed when the stepped valve piston is operated in the working position (see Japanese Utility Model Laid-open Application No. 64561/1988).

Now, referring to the typical construction of the conventional hydraulic brake pressure control valve noted above, it is appreciated from FIG. 6 that a fluid valve 53 commences its valving function abutting upon a valve seat 52 as a stepped valve piston 51 shifts in its sliding stroke toward the left, and with this construction, it is generally known that the fluid valve 53 may often suffer from self-vibrations owing to quickly flowing hydraulic fluid to the delivery side of the control valve by way of a passage 54 upon the opening and closing of the fluid valve 53 with an increase of input/output fluid pressures from the point of valving function commencement (see the point of pressure changes A in FIG. 7). For this reason, when stepping sharply down upon the brake pedal in an emergency, there may occur an abnormal beep noise from such quickly flowing fluid to the valve's delivery side, making the passengers of a vehicle uncomfortable.

This is an undesired effect inherent to a hydraulic brake of conventional construction, which is undoubtedly desired to be prevented from occurring in the braking operation for an automotive vehicle.

OBJECT AND SUMMARY OF THE INVENTION

In an attempt to cope with unpleasant operating noises in the performance of a hydraulic brake pressure control valve according to the conventional construction as noted above, the present invention is essentially directed to the provision of an improvement in construction such that such a drawback of unpleasant noises may effectively be eliminated, and that there is attained a hydraulic brake pressure control valve of simple and noise-free hydraulic brake pressure control valve.

This attempt to solve the problem of unpleasant noises of the hydraulic brake pressure control valve from the conventional construction including a valve casing mounted upon a master cylinder of a hydraulic brake system for an automotive vehicle and a valve piston of stepped configuration with a large diameter portion and a reduced diameter portion mounted slidably and longitudinally along the bore of the valve casing, the stepped valve piston being urged normally toward a non-operating position, and adapted to be shifted in the opposite direction to the sense of normal urging from the non-operating position under the effect of difference in cross-sectional areas of these large and reduced diameter portions thereof upon which the hydraulic brake fluid works, and a brake fluid passage defined longitudinally in the stepped valve piston and communicating the brake fluid passages on the parts of the reduced diameter portion and the large diameter portion of the stepped valve piston, and a further fluid valve disposed in the fluid passage and adapted to hold the fluid valve in an open position when the stepped valve piston is in its non-operating position, and to cause the fluid valve to be opened and closed when the stepped valve piston operates in valving function, may be attained from an improvement, as summarized in brief, in that there is a cap-shaped retainer mounted shiftably radially of a stem of the fluid valve disposed on the opposite side to a valve seat of the stepped valve piston and adapted, when the fluid valve is brought to the open and closed positions, to have one outer wall surface of the retainer abutting upon the inner wall surface of the stepped valve piston.

According to the improvement in construction of the hydraulic brake pressure control valve of the present invention, by virtue of such construction that the retainer has its one outer wall surface abutting closely upon the inner wall surface of the stepped valve piston when the fluid valve is operated in its open and closed positions, it is possible in practice to effectively prevent from occurring possible vibrations of the fluid valve as may be generated by quick flows of hydraulic brake fluid into the delivery side thereof, accordingly.

In addition, according to the present invention, in the hydraulic brake pressure control valve of the type including a valve casing mounted upon a master cylinder of a hydraulic brake system for an automotive vehicle and a valve piston of stepped configuration with a large diameter portion and a reduced diameter portion mounted slidably and longitudinally along the bore of the valve casing, the stepped valve piston being urged normally toward a non-operating position, and adapted to be shifted longitudinally in the opposite direction to the sense of normal urging from the non-operating position under the effect of difference in cross-sectional areas of these large and reduced diameter portions thereof upon which the hydraulic brake fluid works, and a brake fluid passage defined longitudinally in the stepped valve piston and communicating the brake fluid passages on the parts of the reduced diameter portion and the large diameter portion of the stepped valve piston, and a further fluid valve disposed in the fluid passage and adapted to hold the fluid valve in an open position when the stepped valve piston is in its non-operating position, and to cause the fluid valve to be opened and closed when the stepped valve piston operates in valving function, there may be attained an improvement, as summarized in brief, in that there is formed an enlarged diameter portion in the middle of the stem of the fluid valve, and that an inclined surface extending radially from the outer circumference end of the stem of the fluid valve toward the enlarged diameter portion thereof disposed on the valve seat of the stepped valve piston in such a manner that the fluid valve may be caused to be tilted upon the inclined surface when the valve is brought to either of its open and closed positions, whereby the one outer wall surface of the enlarged diameter portion thereof can be allowed abutting upon the inner wall surface of the stepped valve piston.

With this arrangement of the hydraulic brake pressure control valve according to the present invention, by virtue of the provision of the one outer wall surface of the enlarged diameter portion of the fluid valve stem brought abutting upon the inner wall surface of the stepped valve piston, there may be attained an advantageous effect such that the occurrence of vibrations of the fluid valve as may possibly be generated by quick flows of the hydraulic fluid into the delivery side of the control valve may effectively be prevented accordingly.

As reviewed in detail hereinbefore, in the hydraulic brake pressure control valve according to the present invention, there is attained an improvement in construction such that the retainer mounted shiftably radially in the stem of the fluid valve in such a manner that the retainer may have its one outer wall surface brought abutting upon the inner wall surface of the stepped valve piston when the fluid valve is brought to either of its open and closed positions, and consequently, if the hydraulic brake fluid may flow into the delivery side of the valve from between the same and the valve seat thereof upon the opening and closing of the valve, it is possible in practice to prevent any possible vibrations thereof from occurring without affecting its operating performance, thus producing no unpleasant noises in an emergency braking operation of a vehicle, and thus contributing to a comfortable driving for the passenger. Also, by virtue of the attainment of a simple construction with an additional retainer being provided for the hydraulic brake pressure control valve, it may be manufactured with little increase in cost, making it advantageous economically.

Additionally, with the provision of the inclined surface in the stem end surface of the fluid valve which may serve to have one outer wall surface thereof tiltable in one way abutting upon the inner wall surface of the stepped valve piston, if the hydraulic brake fluid may flow into the delivery side from between the fluid valve and the valve seat thereof upon the opening and closing of the fluid valve, the occurrence of possible vibrations of the valve may effectively be prevented without affecting the operating performance thereof, accordingly.

With this improvement as attained in the foregoing one, there is therefore less of a possibility of occurrence of unpleasant noises in an emergency braking operation, thus contributing to a comfortable driving of the vehicle.

BRIEF DESCRIPTION OF THE DRAWINGS

In the accompanying drawings, like parts are designated by like reference numerals, and in which FIGS. 1 and 2 are a series of cross-sectional views showing by way of a preferred embodiment an improved hydraulic brake pressure control valve according to the present invention; wherein FIG. 1 is a general cross-sectional view showing the general construction of a hydraulic brake pressure control valve;

FIG. 2 is an enlarged fragmentary cross-sectional view showing a retainer with the fluid valve being shifted in the closed position thereof;

FIGS. 3 through 5 are a series of like cross-sectional views showing another embodiment of the invention; wherein FIG. 3 is a general cross-sectional view showing the general construction of a hydraulic brake pressure control valve;

FIG. 4 is an enlarged fragmentary cross-sectional view showing a fluid valve being shifted in the closed position thereof;

FIG. 5 is a schematic sectional view showing the working principle of the fluid valve brought in a tilted position;

DETAILED DESCRIPTION OF A PREFERRED EMBODIMENT

The present invention will now be described in detail by way of a preferred embodiment thereof taking reference to the accompanying drawings.

Figure 1:
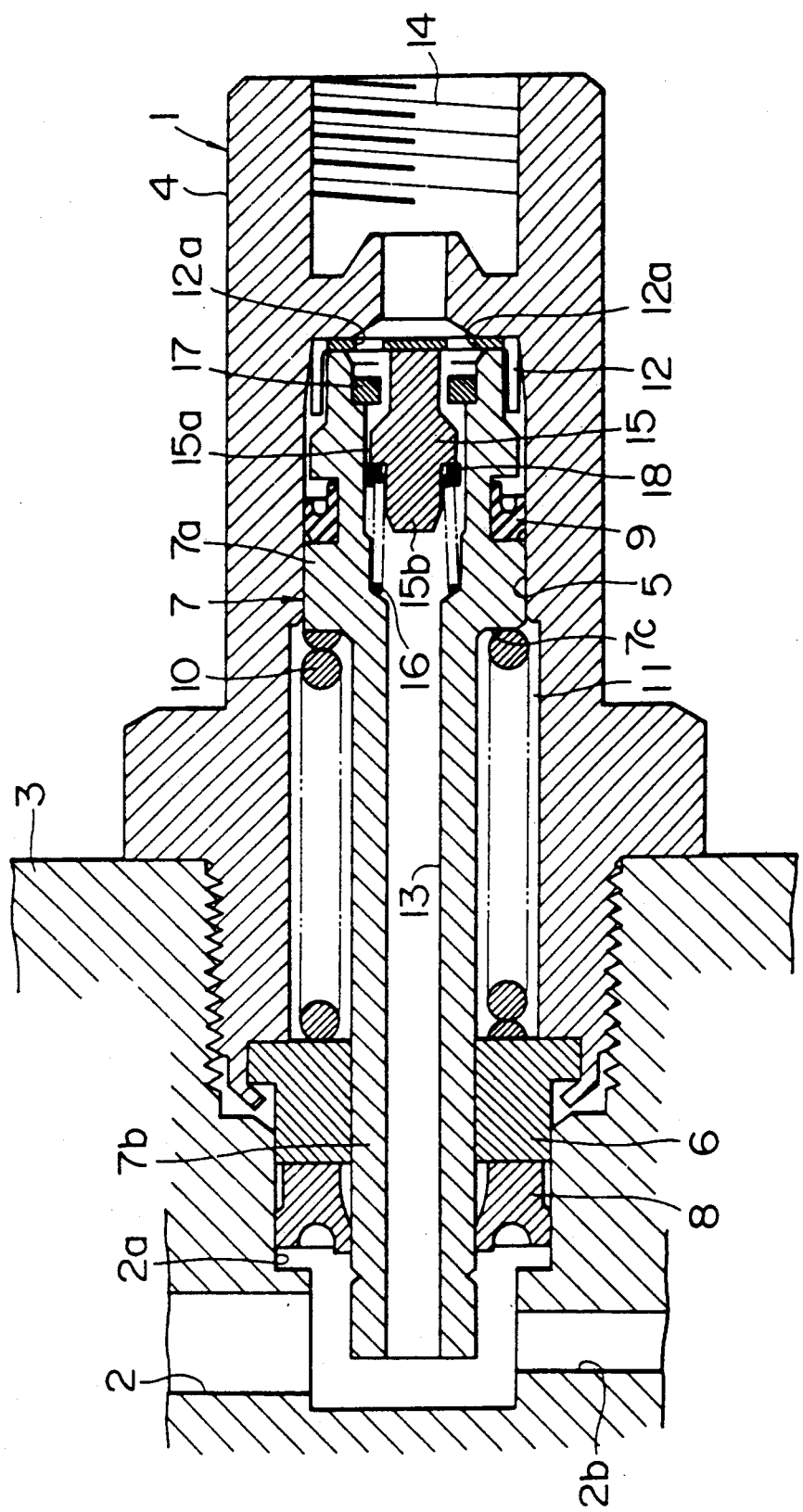
Figure 2:
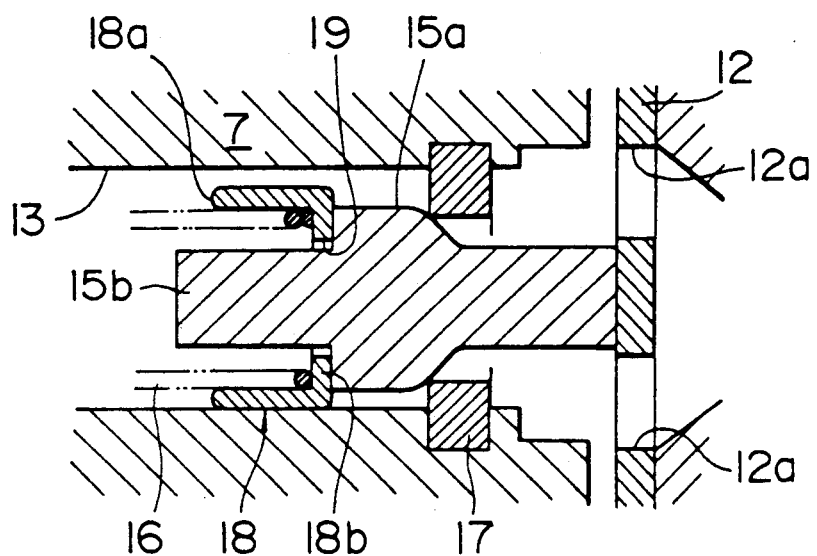

FIGS. 1 and 2 are a series of cross-sectional views showing by way of a preferred embodiment an improved hydraulic brake pressure control valve according to the present invention. In the drawing figures, a hydraulic brake pressure control valve designated at the reference numeral 1 is seen mounted removably upon a housing 3 of a master cylinder in communication with a passage 2 for hydraulic brake fluid defined in a master cylinder housing 3. When there is generated a working pressure of hydraulic brake fluid in the master cylinder by a stepping down upon a brake pedal not shown, it is designed that the pressure of hydraulic brake fluid is relayed to rear wheel brake cylinders not shown through the hydraulic brake pressure control valve 1 by way of a branch passage 2a. It is also designed that thus-generated hydraulic brake pressure is supplied to front wheel brake cylinders not shown by way of a branch passage 2b.

The hydraulic brake pressure control valve 1 has a valve casing 4 formed in a generally cylindrical shape, and there is defined a longitudinal through bore or opening 5 extending along the longitudinal axis thereof. Also, there is mounted an end cap or stop 6 by way of caulking in the end of the valve casing 4 on the part of mounting upon the housing 3. In the through opening 5, there is seen a piston or plunger of stepped configuration 7 fitted slidably along the longitudinal axis of the valve casing and consisting of an enlarged diameter portion 7a and a reduced diameter portion 7b, with the reduced diameter portion 7b extending slidably through the cap 6 and a seal member 8 on the part of the housing 3 in such a manner that the leading end thereof may project into the branch passage 2a for passing the hydraulic brake fluid.

In the outer circumference of the enlarged diameter portion 7a of the stepped plunger 7, there is mounted a seal member 9, and in a space or chamber 11 defined by the outer circumference of the reduced diameter portion 7b and the inner circumference of the through opening 5 between the seal member 9 and the seal member 8, there is mounted a return spring 10. The return spring 10 is placed in resiliently compressed relationship between the cap 6 and a stepped end surface 7c of the stepped plunger 7 in such a manner that the stepped plunger 7 may normally be held in the non-operating position thereof abutting upon a cap-shaped member 12 which is shown fitted within the through opening 5 in FIG. 1 under the resilient force of the return spring 10.

Also, in the stepped plunger 7, there is defined a communicating passage 13 extending longitudinally thereof, the communicating passage 13 extending in communication with a hydraulic brake fluid passage 14 defined in the valve casing 4 by way of an opening 12a of the cap-shaped member 12, and also with the branch passage 2a for the hydraulic brake fluid defined on the part of the housing 3. In the communicating passage 13 extending on the part of the enlarged diameter portion 7a of the stepped plunger 7, there is provided operatively a fluid valve 15 having an enlarged diameter portion 15a.

This fluid valve member 15 is urged normally abutting upon the cap-shaped member 12 under the resilient force of a compression spring 16 provided on the part of the housing 3 in such a manner that it may sit upon a valve seat 17 secured in the circumferenc of the communicating passage 13 with the valving function of the stepped plunger 7, thereby to close the communicating passage 13. With the resilient force of the compression spring 16 selected to be smaller than that of the return spring 10, it serves to hold the fluid valve member 15 away from the valve seat 17 when the stepped plunger 7 is in the non-operating position abutting upon the cap-shaped member 12, thus maintaining the communicating passage 13 in an open position.

Also, in the stem 15b of the fluid valve member 15 disposed in the opposite side to the valve seat 17, there is a cap-like or cup-shaped retainer 18 fitted shiftably radially thereof. With this arrangement, the outer diameter of a sleeved portion 18a of the retainer 18 is defined to be slightly smaller than the inner diameter of the stepped plunger 7, and there is seen provided a space or gap of 0.05 through 0.13 mm on one side between the outer wall surface of the sleeved portion 18a and the inner wall surface of the stepped plunger 7. And, at the bottom end portion 18b of the retainer 18 disposed between the stepped portion 15a of the fluid valve member 15 and the compression spring 16, there is defined a fitting hole 19 having an inner diameter slightly greater than the outer diameter of the stem portion 15b of the fluid valve member 15. With the provision of such dimensions of the cooperating members, when the fluid valve member 15 is brought to either of its open and closed positions, the retainer 18 may be shifted freely radially of the fluid valve member 15, causing one outer wall surface of the sleeved portion 18a to abut immediately upon the inner wall surface of the stepped plunger 7. Also, in the sleeved portion 18a of the retainer 18, there are a plurality of notches not shown defined at a given interval around the circumference thereof, which can serve to cause the hydraulic brake fluid to smoothly flow through the communicating passage 13.

In the improved construction of the hydraulic brake pressure control valve 1 according to the present invention, when the hydraulic brake fluid is fed into the hydraulic brake fluid passage 2 defined in the master cylinder, the working pressure of the hydraulic brake fluid is then relayed to the rear wheel brake cylinders not shown by way of the gap between the fluid valve 15 and the valve member seat 17, and by way of the opening 12a of the cap-shaped member 12 and the hydraulic brake fluid passage 14.

When the current pressure of the hydraulic brake fluid increases in excess of a predetermined level, this pressure is directed working upon the enlarged diameter portion 7a of the stepped plunger 7 passing through the gap between the end surface of the stepped plunger 7 and the cap-shaped member 12 to cause the stepped plunger 7 to be shifted toward the left as viewed in FIG. 2 under the effect of difference in the cross-sectional areas of the output and input sides of the stepped plunger 7 so that the fluid valve 15 may be closed, thus stopping the increase in the hydraulic brake fluid pressure for the rear wheel brake cylinders (see FIG. 2).

Then, as there occurs a further increase in pressure of the hydraulic brake fluid on the part of the hydraulic brake fluid passage 2, the stepped plunger 7 may be caused to be shifted forwardly or rearwardly according to an extent of increase in pressure, increasing the current pressure of the hydraulic brake fluid for the rear wheel brake cylinders with a smaller rate of increase than a rate of increase in pressure for the front wheel brake cylinders in proportion to the ratio of the fluid receiving areas on the opposite ends thereof.

Now, referring more strictly to the present embodiment of the invention, when the fluid valve 15 is brought to be opened or closed accordingly to the current motion in the forward or rearward direction of the stepped plunger 7, the one outer wall surface of the sleeved portion 18a may be caused to abut immediately upon the inner wall surface of the stepped plunger 7 as shown in FIG. 2, and as a consequence, if the hydraulic brake fluid may flow quickly into the delivery side of the fluid valve member 15 passing through the gap between the fluid valve and the valve seat 17, there is no possibility of vibrations of the fluid valve member 15, accordingly.

Figure 3:
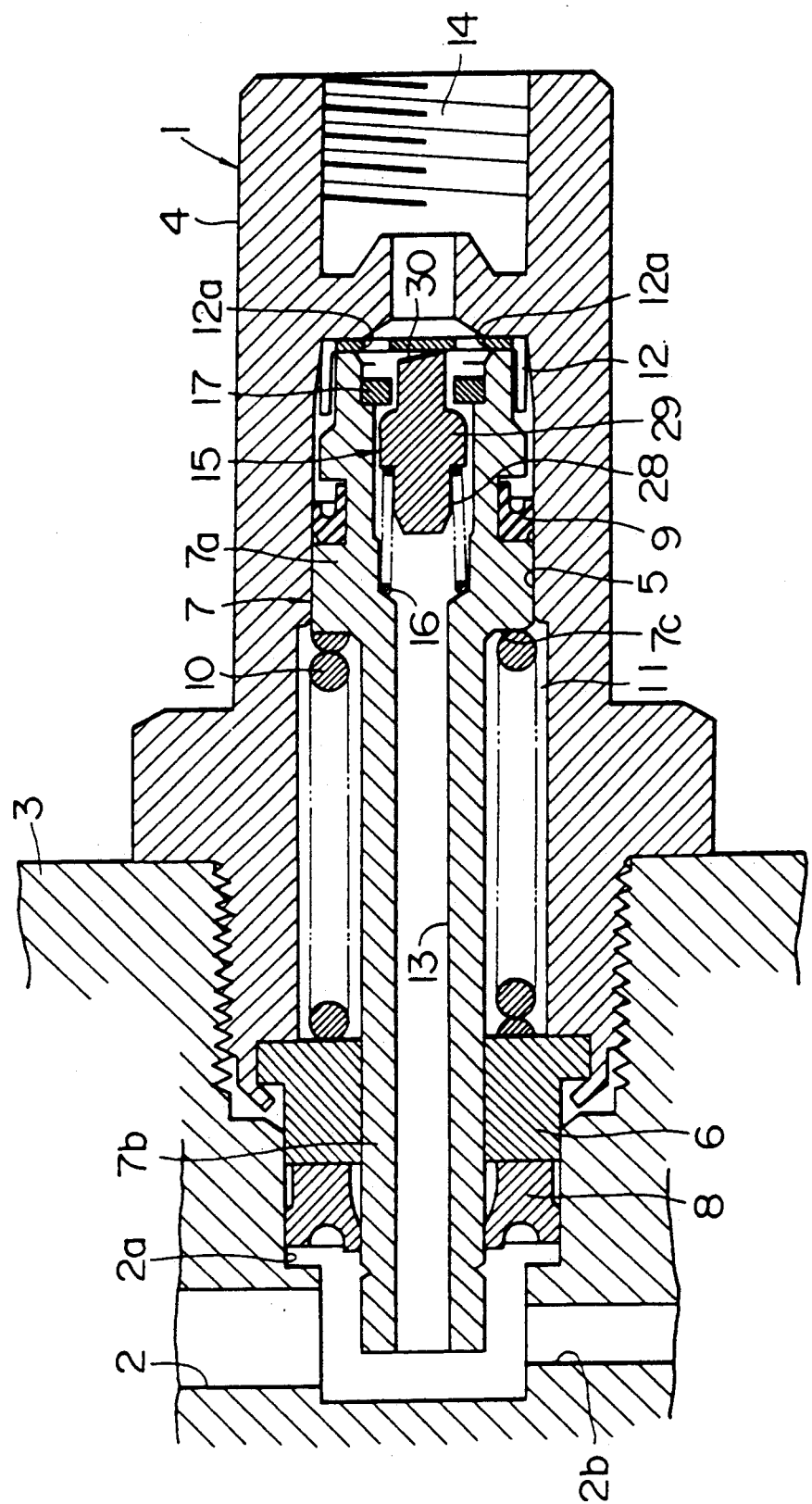
Figure 4:
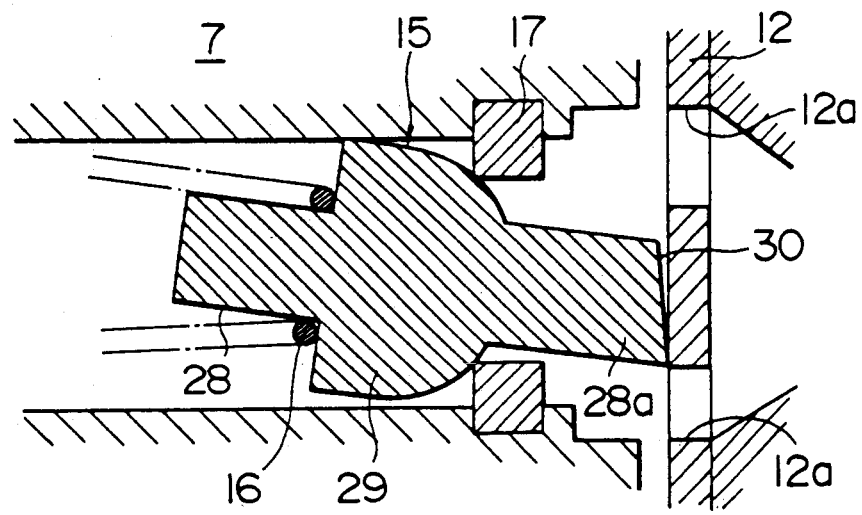
Figure 5:
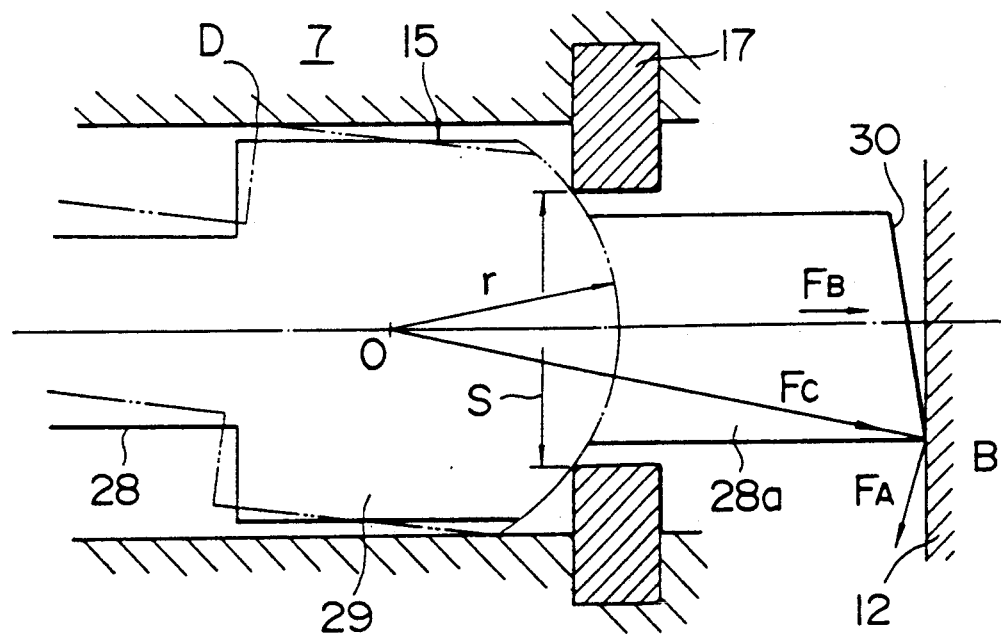
Figure 6:
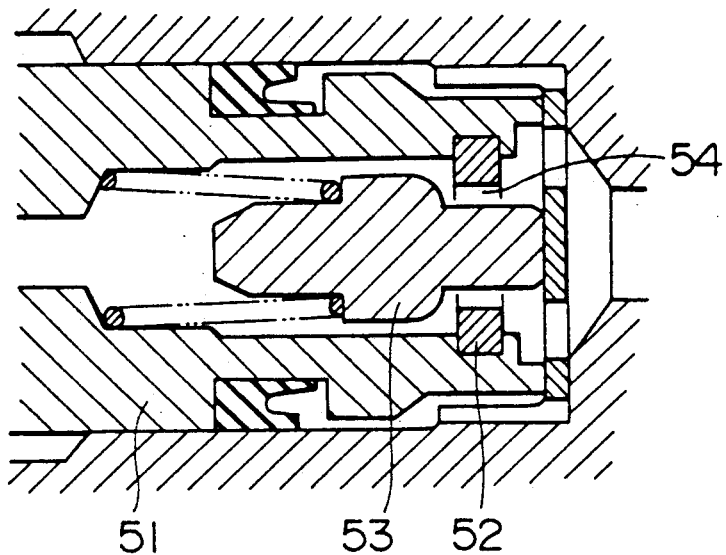
FIG. 6 is a fragmentary cross-sectional view showing part of a typical conventional hydraulic brake pressure control valve.
Figure 7:
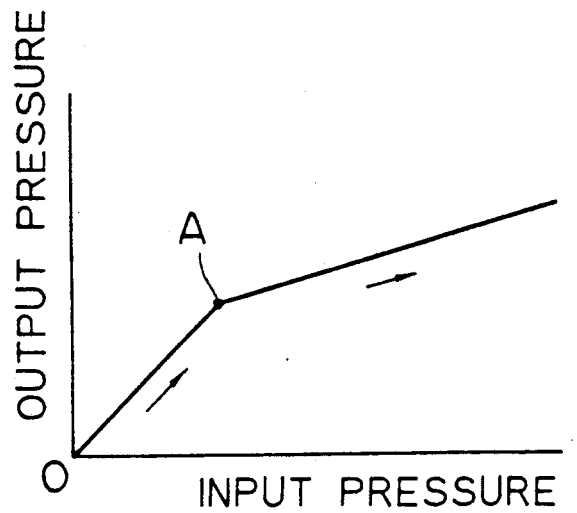
FIG. 7 is a graphic representation showing the general performance in terms of the relationship of input and output pressures in a hydraulic brake pressure control valve.

FIGS. 3 through 5 are like cross-sectional views showing by way of another preferred embodiment the hydraulic brake pressure control valve according to the present invention. As the basic construction and general operation of the hydraulic brake pressure control valve 1 of this embodiment are similar to those of the embodiment of the invention stated hereinbefore, the like parts are designated at the like reference numerals, omitting a further explanation thereof.

The fluid valve member 15 having the advantages particular to the present invention is shown comprising a stem portion 28 and an enlarged diameter portion 29 defined generally in the center of the stem portion 28, wherein in the end surface of a stem portion 28a disposed on the part of the valve seat 17 there is provided a radially inclined surface 30 having preferably an angle of inclination of 10 degrees or smaller extending from the lower edge of the outer circumference thereof toward the enlarged diameter portion 29. The enlarged diameter portion 29 defined opposedly to the valve seat 17 is formed in an arcuate curvature with a radius "r", thus allowing ready tilting motion with respect to the valve seat 17 upon which it may turn abuttingly. With this arrangement, when the fluid valve member 15 is caused to be close, the part having a pressure receiving area S shown in FIG. 5 may then receive the current pressure of the hydraulic brake fluid, causing the fluid valve member 15 to be urged longitudinally of the axis thereof toward the right as shown in FIG. 5 under a urging force of $F_B$. Then, at the point of contact B with the cap-shaped member 12, there is an inclination of force $F_A$ around the center O to obtain a resultant force $F_C$. Consequently, as the fluid valve member 15 may be caused to be inclined rotating clockwise at the center of contact B, thus causing one outer wall surface (point D) of the enlarged diameter portion 29 to abut immediately upon the inner wall surface of the stepped plunger 7, as shown in dot-and-chain line.

Referring more strictly to this embodiment of the invention, as the fluid valve member 15 is brought to be in either of its open or closed positions accordingly to the current motion in either of the forward or rearward directions of the stepped plunger 7, causing the one outer wall surface of the enlarged diameter portion 29 to abut immediately upon the inner wall surface of the stepped plunger 7, there is no possibility of vibrations occurring in the fluid valve member 15, should the hydraulic brake fluid pass quickly through between the fluid valve member 15 and the valve seat 17 into the delivery side thereof.

While the invention has been described in conjunction with specific embodiments thereof, it is to be understood that the present invention is not to be restricted to such embodiments stated herein and that many variations and modifications may be made in the light of the aforegoing technical concept of the invention.

For example, it is needless to mention that the configuration of the fluid valve member 15 is not intended to be the one as shown in the accompanying drawings, but that it may be adapted appropriately in accordance with the interior shape of the opening of the stepped plunger 7.

Also, while there is provided the inclined surface 30 which is directed radially toward the enlarged diameter portion 29 from the lower edge portion of the outer circumference of the stem portion 28a in the embodiment disclosed herein, it is to be understood that it may of course be inclined radially in any of several ways toward the enlarged diameter portion 29 as long as it is disposed eccentrically from its axial center of the stem portion 28a toward the outer circumference.

Lastly, it is also to be understood that the appended claims are intended to cover all of such generic and specific features as are particular to the invention as disclosed herein and all statements relating to the scope of the invention, which as a matter of language might be said to fall thereunder.

I claim:

1. A hydraulic brake pressure control valve of the type including a valve casing mounted upon a master cylinder of a hydraulic brake system and a valve piston of stepped configuration with an enlarged diameter portion and a reduced diameter portion mounted slidably and longitudinally along the longitudinal bore of said valve casing, said stepped valve piston being urged normally toward a non-operating position thereof, and adapted to be shifted longitudinally in the opposite direction from said non-operating position, under the effect of a difference in the cross-section areas of said enlarged and reduced diameter portions thereof upon which the hydraulic brake fluid pressure works, and said stepped valve piston being defined with a brake fluid passage means extending longitudinally therein and providing communication between brake fluid passages adjacent said reduced diameter portion and said enlarged diameter portion of said stepped valve piston, and a fluid valve member disposed in said fluid passage means and adapted to hold said fluid passage means in an open position when said stepped valve piston is in the non-operating position thereof, and to cause said fluid valve member to be opened and closed when said stepped valve piston operates in valving function, which further comprises cap-shaped retainer means mounted for shifting radially of a stem of said fluid valve member, disposed in an opposed relation to a valve seat of said stepped valve piston, when said fluid valve is brought to either of the open and closed positions thereof, one outer wall surface of said retainer abutting an inner wall surface of said stepped valve piston.

2. A hydraulic brake pressure control valve of the type including a valve casing mounted upon a master cylinder of a hydraulic brake system and a valve piston of stepped configuration with an enlarged diameter portion and a reduced diameter portion mounted slidably and longitudinally along a longitudinal bore of said valve casing, said stepped valve piston being urged normally toward a non-operating position thereof, and adapted to be shifted longitudinally in an opposite direction from said non-operating position under the effect of difference in the cross-sectional areas of said enlarged and reduced diameter portions thereof, upon which the hydraulic brake fluid pressure works, and said stepped valve piston being defined with a brake fluid passage means extending longitudinally therein and providing communication between a brake fluid passage on said reduced diameter portion and said enlarged diameter portion of said stepped valve piston, and a fluid valve member disposed in said fluid passage and adapted to hold said fluid passage means in an open position when said stepped valve piston is in the non-operating position thereof, and to cause said fluid valve member to be opened and closed when said stepped valve piston operates in valving function; wherein said fluid valve member is formed with an enlarged diameter portion in the middle of a stem thereof, and wherein said fluid valve member includes means defining an inclined surface extending radially at an end of said fluid member from an outer circumference end surface of the stem of said fluid vale member toward said enlarged diameter portion thereof disposed on the valve seat of said stepped valve piston in such a manner that said fluid valve member may be tilted upon said inclined surface when said fluid valve member is brought to either of the open and closed positions thereof, whereby an outer wall surface of said enlarged diameter portion of said fluid valve abuts upon an inner wall surface of said stepped valve piston.

* * * * *